(No Model.)
F. A. GOOCH.
PROCESS OF REDUCING ALUMINIUM.
No. 578,633. Patented Mar. 9, 1897.
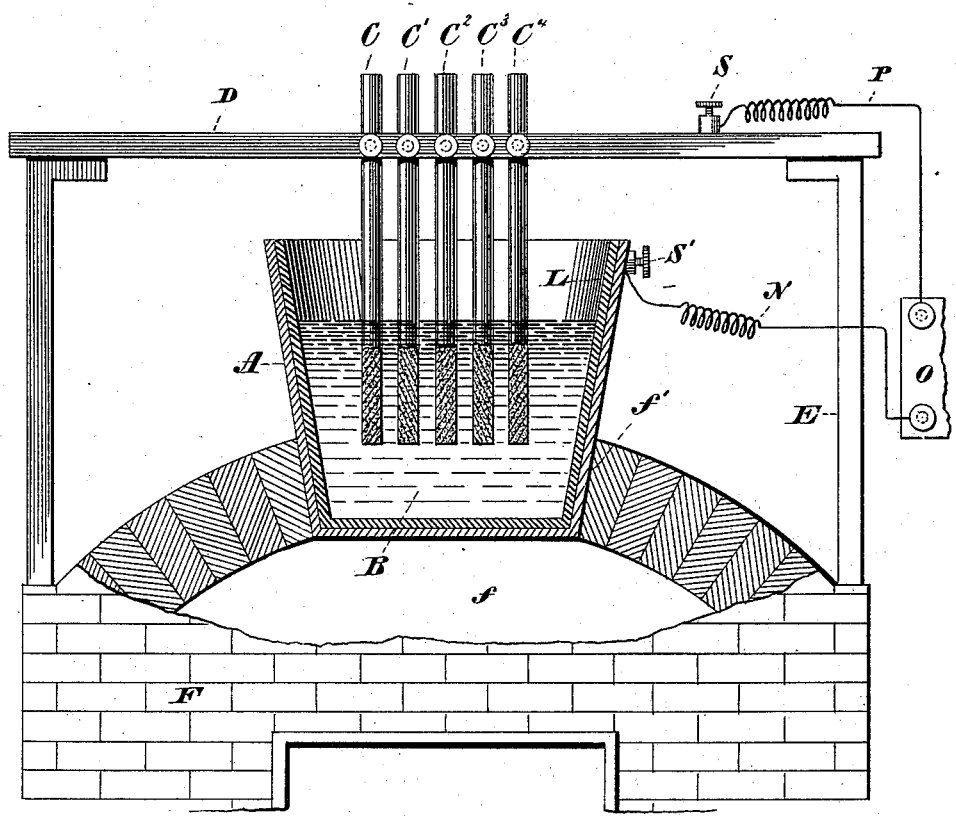
WITNESSES:
INVENTOR
Frank A. Gooch
BY
Frank L. Crawford
ATTORNEY.

UNITED STATES PATENT OFFICE.

FRANK A. GOOCH, OF NEW HAVEN, CONNECTICUT.

PROCESS OF REDUCING ALUMINIUM.

SPECIFICATION forming part of Letters Patent No. 578,633, dated March 9, 1897.

Application filed May 11, 1896. Serial No. 591,023. (No specimens.)

*To all whom it may concern:*

Be it known that I, FRANK A. GOOCH, residing at New Haven, in the county of New Haven and State of Connecticut, have invented certain new and useful Improvements in Processes of Reducing Aluminium; and I do hereby declare the following to be a full, clear, and exact description of the invention, such as will enable others skilled in the art to which it appertains to make and use the same.

The invention herein described relates to processes for the reduction of aluminium by the electrolysis of a suitable fused bath.

In general terms my invention consists in fusing together the fluorid of a suitable alkaline metal, the oxid of aluminium, and a suitable hydrous chlorin compound of aluminium and passing an electric current through the fused mass, thereby electrolyzing the same. I have found that the alkaline metals whose fluorids are most suitable for employment in my process are sodium and potassium. I preferably employ the fluorid of sodium, but the fluorid of potassium can also be used with almost equal success.

It is well known that sodium fluorid in a fused condition will not dissolve the oxid of aluminium, commonly known as "alumina." If powdered alumina be placed in a crucible containing fused sodium fluorid, the alumina will remain in suspension, whatever the degree of heat in the mixture. I find, however, when a small amount of the hydrous crystalline chlorid of aluminium (whose formula is $Al_2Cl_6 12H_2O$) is added to the fused sodium fluorid containing the alumina in suspension that the chlorid dissolves, and immediately thereafter the insoluble alumina dissolves also; also, the other hydrous chlorids and the various hydrous oxychlorids of aluminium, (the latter produced by heating the hydrous chlorids,) when added to sodium fluorid in which alumina is held in suspension, will, when their contents in chlorin are sufficiently great, themselves dissolve freely and will cause the alumina to dissolve. I use the term "hydrous chlorin compound of aluminium" in this specification and in the claims hereto annexed to embrace the ordinary hydrous chlorids of aluminium and also the hydrous oxychlorids. Of the various chlorids mentioned I find the hydrous crystalline chlorid upon the whole the most economical and suitable one to employ, though the other hydrous chlorin compounds mentioned answer almost equally well for theoretical purposes.

More particularly, therefore, my invention consists in the improved process herein described, which consists in fusing together sodium fluorid, alumina, and a suitable hydrous chlorid of aluminium and passing an electric current through the fused mass, thereby electrolyzing the same.

It is well known that when ordinary hydrous crystalline chlorid of aluminium is heated strongly by itself it is decomposed ultimately into alumina, water, and hydrochloric acid. It is also known that when the solution of the chlorid in water is simply evaporated by heat to dryness only a part of the chlorin is given off, while a basic chlorid or oxychlorid still retaining water constitutes the residue. When the heating is so conducted that the loss of chlorin does not exceed one-half the entire amount of that element contained in the crystalline chlorid, the hydrous oxychlorid remaining is soluble in hot water, which shows that the decomposition of the chlorid has in this case not gone so far as to produce alumina. I find also that a hydrous oxychlorid of aluminium which is soluble in water may also be obtained by drying the hydrous aluminium chlorid taken in crystalline or solid condition until it has lost from one-third to one-half of its chlorin, together with a portion of its water. Such a hydrous oxychlorid of aluminium I find dissolves in fused sodium fluorid. I find also that when the hydrous crystalline aluminium chlorid is thrown into fused sodium fluorid a similar action takes place. The hydrous chlorid completely dissolves in the fused sodium fluorid, and if alumina is present in suspension it also will be dissolved. It would appear that the high temperature of the bath sets up chemical interaction before the hydrous chlorid or oxychlorid has had time to undergo excessive decomposition due to the action of heat alone. When the hydrous chlorid or the hydrous oxychlorid, as the case may be, is mixed with cold sodium fluorid and the mixture then heated to fusion, the solvent action of the sodium fluorid is manifested similarly but not quite to the same extent as when the hydrous chlorid or oxychlorid is brought quickly into contact with the fluorid already in a state of fusion. Not only the crystalline chlorid, but also the other hydrous chlorids and the various hydrous oxychlorids (produced by heating the hydrous chlorid) in like manner, when their contents in chlorin are sufficiently great, will not only dissolve in fused sodium fluorid, but will render the bath thus produced capable of dissolving alumina.

In the accompanying drawing, which is hereby made a part of this specification, is shown one form of apparatus suitable for the practice of my invention. I do not, however, limit myself to the apparatus shown, since any other suitable apparatus would answer equally well for the practice of my invention.

In the drawing, F is a furnace having a fire-box $f$ and opening $f'$ in the top of the furnace, into which is set a tapering crucible A, the same being supported by the sides of the opening $f'$.

The crucible A preferably employed in the operation of my invention consists of a tank of iron lined with compacted carbon. The carbon lining L of this tank serves as the cathode, the iron of the tank being connected by the conductor N with the negative pole of a dynamo-electric machine or other suitable source of electricity O. For the anode I preferably use a number of separate carbon electrodes C C' C² C³ C⁴, which are preferably suspended from an iron bar D, raised above the crucible, resting on wooden supports E E. These electrodes are partially immersed in the bath contained in the crucible.

The bar D is connected by the conductor P to the positive pole of the source of electricity. If desired, the cathode may also be formed of a detached carbon suspended in a similar way for that just described for the anode or otherwise supported and partially immersed in the bath. A single electrode might also be used in place of the separate carbons shown in the drawing, which, when used collectively, form the anode, the relative superficial areas of the electrodes in any particular case being adjusted so as to secure the greatest economy of action. In place of a carbon anode an anode of any other suitable material, as of platinum, may be used. S S' are binding-posts for the conductors N P. B is the bath contained in the crucible A, through which the electric current is passed.

In the practice of my invention I preferably prepare a bath by fusing in the crucible A in proper proportions the fluorid of sodium, alumina, and the hydrous crystalline chlorid of aluminium corresponding to the symbol $Al_2.Cl_6.12H_2O$. These ingredients are preferably mingled together in the following proportions: sodium fluorid, (NaF,) one hundred parts; hydrous chlorid of aluminium, $(Al_2.Cl_6.12H_2O,)$ one hundred and twenty-five parts; alumina, $(Al_2.O_3,)$ eight parts; but these proportions are variable, serviceably, within reasonable limits without materially affecting the operation or function of the bath, as, in fact, any proportions which may be found suitable may be employed. If the amount of the chlorid added be insufficient, the result will be that part of the alumina will remain in suspension. On the other hand, a moderate excess of the chlorid will produce no deleterious effect.

The bath may be fused and the fusion may be maintained by the application of heat from any suitable source, as externally from the furnace F. The temperature required to fuse the baths suggested above is that of red heat. The ingredients of the bath may also be fused together in a separate apparatus and introduced in a molten condition into the crucible at the beginning of the process, the fusion being thereafter maintained in any suitable way. If now the electric current is passed through the bath and electrolysis takes place, aluminium is deposited at the cathode, whence it may be removed in any suitable and well-known manner. By adding alumina to the bath from time to time in suitable quantities the process becomes a substantially continuous one through a considerable period of time. A moderate excess in the amount of alumina added does no harm.

In the process herein described an electric current of suitably low electromotive force, say of from four to ten volts, is used, but the voltage of the current required will depend on the size and form of the electrodes, as well as on the condition of the bath under all the existing circumstances of resistance and of chemical constitution. The hydrous chlorin compound of aluminium in my process herein described may be introduced into the bath before or after the alumina, or may be mixed with the sodium fluorid in a dry state and the mixture fused, the order of operations not being of essential importance. I find, however, that there is less evolution of hydrochloric acid from the mixture, and consequently that a given amount of the hydrous chlorin compound has greater effectiveness, if the hydrous chlorin compound is added to the mixture of sodium fluorid and alumina when the former is already in a state of fusion.

If preferred, in place of using alumina as such in the constitution of the original bath, the hydrous chlorin compound may be used in excess of the amount of the same which will dissolve in the sodium fluorid. The excess of the hydrous chlorin compound would be decomposed by the heat of the bath mainly into alumina, water, and a small amount of hydrochloric acid. The alumina necessary to constitute the bath would thus be supplied indirectly through the excess of the hydrous chlorin compound. When this method of constituting the bath is employed, I preferably constitute the bath in the proportion of one hundred parts of sodium fluorid to two hundred parts of the hydrous chlorid of aluminium. When the current is passed through the bath thus constituted, aluminium is deposited as before. I then preferably make the bath continuous by adding alumina from time to time in suitable quantities, as before stated. It would be possible to supply all the alumina necessary for the continuous process by simply adding additional quantities of the hydrous chlorid of aluminium, but such a method would be disadvantageous, because it would result in the formation of large quantities of hydrochloric acid, which would have to be disposed of in order to prevent danger to the workmen. The conditions as to temperature, voltage, and methods of creating and maintaining fusion are the same whether the alumina is supplied in the first instance as such or through the excess of the hydrous chlorid in the manner described.

Having described my invention, what I claim, and desire to secure by Letters Patent, is—

1. As an improvement in the art of manufacturing aluminium, the herein-described process which consists in fusing together sodium fluorid, the oxid of aluminium and a suitable hydrous chlorin compound of aluminium, and passing an electric current through the fused mass, substantially as described.

2. As an improvement in the art of manufacturing aluminium, the herein-described process which consists in fusing together sodium fluorid, alumina and a suitable hydrous chlorid of aluminium, and passing an electric current through the fused mass, substantially as described.

3. As an improvement in the art of manufacturing aluminium, the herein-described process which consists in fusing together sodium fluorid, alumina and the hydrous crystalline chlorid of aluminium, whose symbol is $Al_2.Cl_6.12H_2O$, and passing an electric current through the fused mass, substantially as described.

4. As an improvement in the art of manufacturing aluminium, the herein-described continuous process which consists in fusing together sodium fluorid, the oxid of aluminium and a suitable hydrous chlorin compound of aluminium, passing an electric current through the fused mass, and adding to the bath from time to time suitable quantities of the oxid of aluminium, substantially as described.

5. As an improvement in the art of manufacturing aluminium, the herein-described continuous process which consists in fusing together sodium fluorid, alumina and a suitable hydrous chlorid of aluminium, passing an electric current through the fused mass, and adding to the bath from time to time suitable quantities of alumina, substantially as described.

6. As an improvement in the art of manufacturing aluminium, the herein-described continuous process which consists in fusing together sodium fluorid, alumina and the hydrous crystalline chlorid of aluminium, whose symbol is $Al_2.Cl_6.12H_2O$, passing an electric current through the fused mass, and adding to the bath from time to time suitable quantities of alumina, substantially as described.

7. As an improvement in the art of manufacturing aluminium, the herein-described process which consists in fusing together sodium fluorid and the hydrous crystalline chlorid of aluminium in excess of the amount thereof which will dissolve in the sodium fluorid used, and passing an electric current through the fused mass, substantially as described.

8. As an improvement in the art of manufacturing aluminium, the herein-described continuous process which consists in fusing together sodium fluorid and the hydrous crystalline chlorid of aluminium in excess of the amount thereof which will fuse in the sodium fluorid used, passing an electric current through the fused mass, and adding to the bath from time to time suitable quantities of alumina, substantially as described.

FRANK A. GOOCH.

Witnesses:
D. ALBERT KREIDER,
PHILIP L. BROWNING.